United States Patent [19]

Wedel et al.

[11] 4,395,793
[45] Aug. 2, 1983

[54] PHOTOGRAPHIC FILM CLEANER

[75] Inventors: John A. Wedel, Mendota Heights; Robert L. Skubic, Bloomington, both of Minn.

[73] Assignee: Pako Corporation, Minneapolis, Minn.

[21] Appl. No.: 349,930

[22] Filed: Feb. 18, 1982

[51] Int. Cl.$^3$ .............................................. A47L 5/14
[52] U.S. Cl. .................... 15/303; 15/306 B; 15/316 R; 355/30
[58] Field of Search ............ 15/306 R, 306 A, 306 B, 15/316 R, 303; 355/30

[56] References Cited

U.S. PATENT DOCUMENTS

| | | | |
|---|---|---|---|
| 3,518,713 | 7/1970 | Krause | 15/306 A |
| 3,873,194 | 3/1975 | Schwartz | 353/110 |
| 4,003,101 | 1/1977 | Saito | 15/316 R X |
| 4,132,469 | 1/1979 | Harvey | 353/25 |
| 4,194,822 | 3/1980 | Sethi | 354/121 |
| 4,203,733 | 5/1980 | Clifton et al. | 355/64 |
| 4,204,733 | 5/1980 | Modney et al, | 355/64 |
| 4,208,116 | 6/1980 | Morse | 354/275 |
| 4,208,117 | 6/1980 | Harvey et al. | 354/275 |
| 4,212,673 | 7/1980 | Sethi et al. | 430/496 |
| 4,255,034 | 3/1981 | Harvey et al. | 354/121 |
| 4,264,169 | 4/1981 | Harvey | 354/121 |
| 4,268,145 | 5/1981 | Harvey et al. | 354/121 |

Primary Examiner—Chris K. Moore
Attorney, Agent, or Firm—Kinney, Lange, Braddock, Westman and Fairbairn

[57] ABSTRACT

A film cleaning apparatus cleans photographic film while the film is clamped at the print gate aperture of a photographic printer. When the film is clamped at the print gate, and before a print exposure is initiated, high velocity ionized air is directed onto both the top and bottom surfaces of the film to remove dust and other foreign materials from the film surfaces. When the exposure is commenced, the flow of ionized air is reduced to a low velocity which is sufficient to prevent dust from settling on the film surfaces during exposure.

17 Claims, 8 Drawing Figures

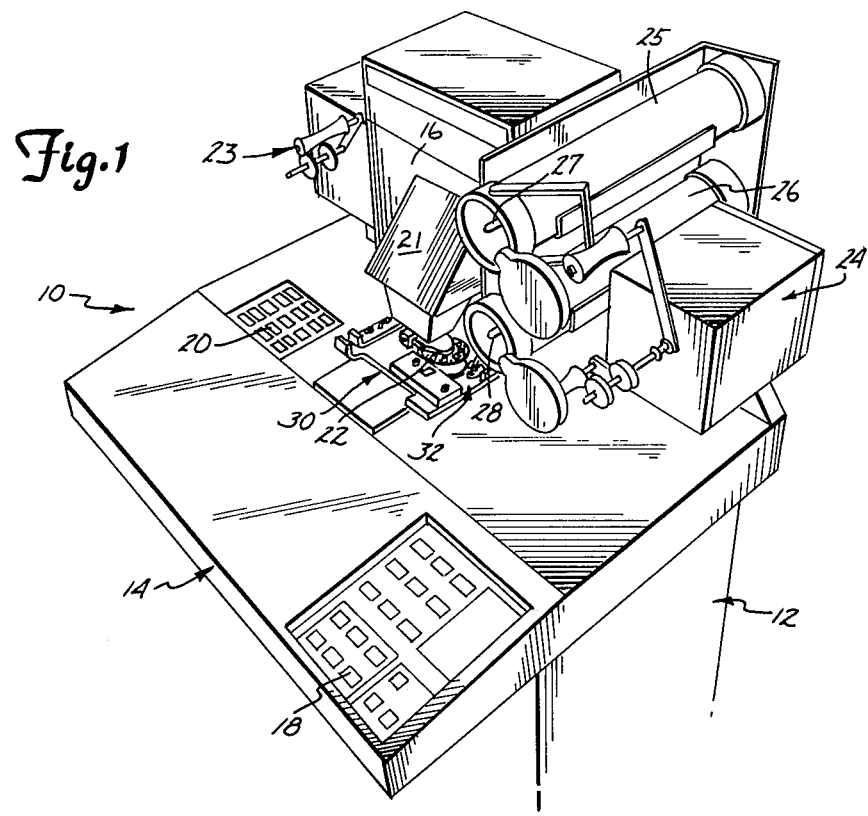

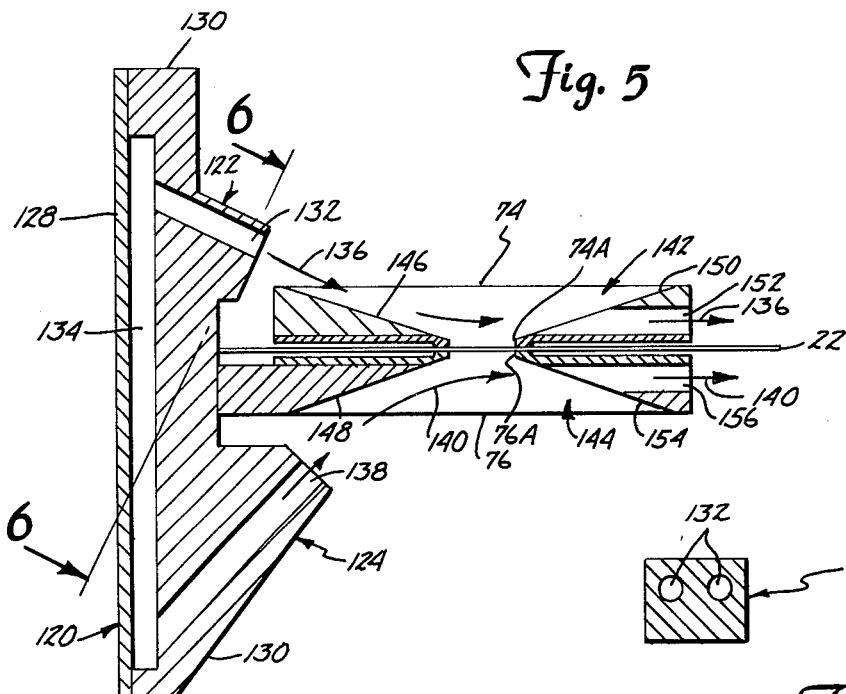
Fig. 5
Fig. 6
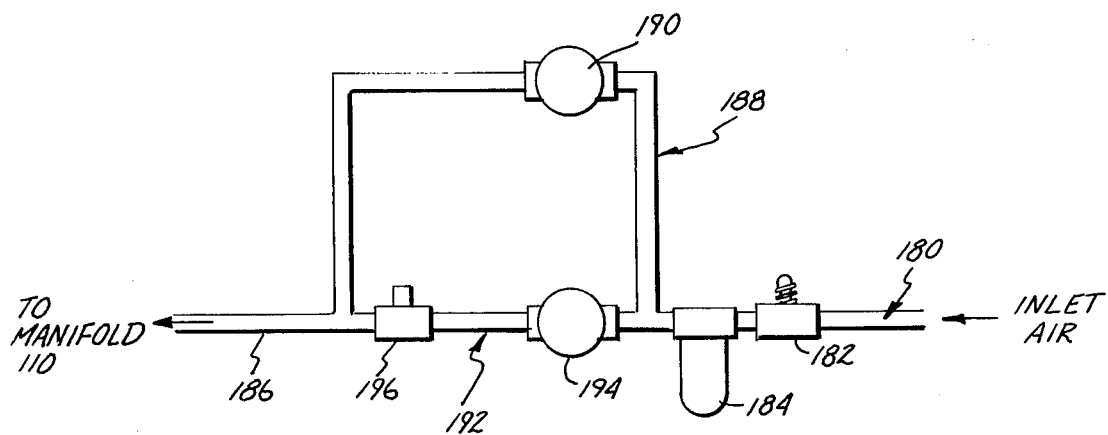
Fig. 7

PHOTOGRAPHIC FILM CLEANER

CROSS-REFERENCE TO COPENDING APPLICATIONS

Reference is hereby made to the following copending applications filed on even date herewith and assigned to the same assignee: "Disc Film Advance Assembly" Ser. No. 349,926; "Disc Film Frame Position Indicator" Ser. No. 349,927; "Disc Film Holder for Photographic Printer" Ser. No. 349,928; and "Neghold Assembly" Ser. No. 349,929.

BACKGROUND OF THE INVENTION

1. Field of the Invention

The present invention relates to photographic printers. In particular, the present invention is an improved film cleaning apparatus for removing dust and foreign materials from photographic film prior to and during a print exposure.

2. Description of the Prior Art

In commercial photographic processing operations, exposed, undeveloped photographic film is received from customers for processing. In the past, this exposed photographic film has typically been in the form of strips of photographic film rolled within a container and containing 12, 20, 24 or 36 exposures.

After the photographic film is developed, the photographic images contained in the film (which are generally in the form of negatives) are printed in an edge-to-edge relationship on a continuous web of photosensitive paper by a photographic printer machine. The photographic printer causes high intensity light to be passed through the film and imaged on the photographic print paper to expose the photographic emulsion layers of the paper. The print paper is subsequently processed to produce a print of the image contained in the film.

In many photographic printers, film cleaning apparatus is provided which removes fine dust and other foreign materials from the photographic film prior to printing of that film. Since photographic film is a dielectric material, there is a tendency for static electric charge to be developed on the surface of the film during handling. This static electric charge tends to attract dust to the film surfaces. If the dust is not removed prior to the printing, the dust particles of the negative may appear as imperfections in the resulting print. The smaller the image area of the film and the larger the magnification of the image used to produce the print, the more critical the problem of dust and other foreign material on the film.

One type of film cleaning device which has been used in the past is the 3M film cleaner sold by Minnesota Mining and Manufacturing Company. U.S. Pat. No. 3,644,953 by Christiansen describes a film cleaning apparatus of this type, which has a pair of support members in opposed relationship which define a nip. Two lengths of soft, lint-free wiping cloth extend through the nip and form a part of the path of the film through the film cleaner. In addition, a nuclear ionizing device is typically provided to ionize the air along the path and neutralize static charges on the film.

The film cleaning apparatus of the type described in the Christiansen patent, however, has several shortcomings. First, the apparatus cleans the photographic film at a position upstream from the print gate of the printer. Thu dust and other foreign particles can still reaccumulate on the photographic film between the film cleaning apparatus and the print gate. Second, the film cleaning apparatus in the Christiansen patent is usable only with photographic film which is in the form of a strip or web. It is not suited for cleaning photographic film which is in a disc film format, in which individual image frames located circumferentially about a central hub.

Examples of this disc film format of photographic film are disclosed in the following U.S. patents.

| Inventor | U.S. Pat. No. |
| --- | --- |
| Sethi | 4,193,822 |
| Morse | 4,208,116 |
| Harvey et al | 4,208,117 |
| Sethi et al | 4,212,673 |
| Harvey et al | 4,255,034 |
| Harvey | 4,264,169 |
| Harvey et al | 4,268,145 |

The need for a highly effective film cleaning apparatus is particularly critical in the case of the disc format photographic film described in the above-mentioned patents. The image area of this type of disc format film is smaller than the image area of 110 format film (which is the smallest of the commonly used strip or web format photographic films). The magnification required to print from disc format film, therefore, is larger than that used with 110 format film, and the undesirable effects of dust on the image area are therefore increased.

In the prior art, there have been manual techniques for removing dust and foreign particles from photographic film prior to printing. One of these techniques has involved the use of a hand-held container from which high velocity air can be emitted. The operator uses the hand-held device to direct a blast of high velocity air onto the surface of the film in order to remove dust. This technique is normally performed when very large image area film formats are being printed. This manual technique is not suited to automatic operation and to the high rates of processing which are typically required in commercial photographic processing operations.

In U.S. Pat. Nos. 4,203,664 by Clifton et al and 4,204,733 by Modney et al, photographic printers are shown in which disc films are handled. Both patents show air nozzles for cleaning the disc film prior to the disc film being moved to another station at which printing occurs.

There is a need for an improved film cleaning apparatus which is applicable both to web and disc format films, which ensures that dust or other foreign material does not reaccumulate on the photographic film between the time that the film is cleaned and the time when a print exposure occurs, and which is consistent with automatic, high speed operation of a photographic printer.

SUMMARY OF THE INVENTION

The present invention is a film cleaning apparatus for use in conjunction with a photographic printer. The photographic printer includes means for indexing photographic film to successively bring image areas of the photographic film into alignment with a print gate aperture. When the film has been indexed, clamping means clamps the film to maintain the photographic film in a fixed position at the print gate aperture.

The film cleaning apparatus of the present invention includes means for directing a first higher velocity gas onto the film clamped at the print gate aperture prior to commencement of an exposure cycle of the photographic printer. This first higher velocity gas removes dust from the image area of the film clamped at the print gate aperture. The film cleaning apparatus also includes means for directing a second lower velocity gas onto the clamped image area of the film during exposure to prevent dust from resettling on the film during exposure.

In preferred embodiments of the present invention, both the first higher velocity gas and the second lower velocity gas are supplied from a manifold which has a top outlet for directing gas onto a top surface of the clamped film and a bottom outlet for directing gas upward onto the bottom surface of the clamped film. Thus both the top and bottom surfaces of the film are cleaned by the film cleaning apparatus. The top and bottom outlets preferably direct the gas at an acute angle with respect to the film, and the clamping means has ramped surfaces to provide an essentially smooth continuous path for the gas and the dust particles.

The film cleaning apparatus of the present invention also preferably includes means for ionizing the gas before it is directed onto the film surfaces. The ionized gas tends to neutralize static charges, and thus enhances the removal of dust from the film surfaces.

BRIEF DESCRIPTION OF THE DRAWINGS

FIG. 1 is a perspective view of a photographic printer for printing disc format film which includes the film cleaning apparatus of the preset invention.

FIG. 2 is a top plan view of a neghold assembly of the photographic printer of FIG. 1, which includes the film cleaning apparatus of the present invention.

FIG. 5 is a sectional view along section 5—5 of FIG. 3 illustrating the operation of the film cleaning apparatus of the present invention.

FIG. 6 is a sectional view along section 6—6 of FIG. 5 showing the upper nozzles of the film cleaner manifold shown in FIG. 5.

FIG. 7 is a schematic diagram of the air supply system of the film cleaning apparatus of the present invention.

DETAILED DESCRIPTION OF THE PREFERRED EMBODIMENTS

Figure 3:
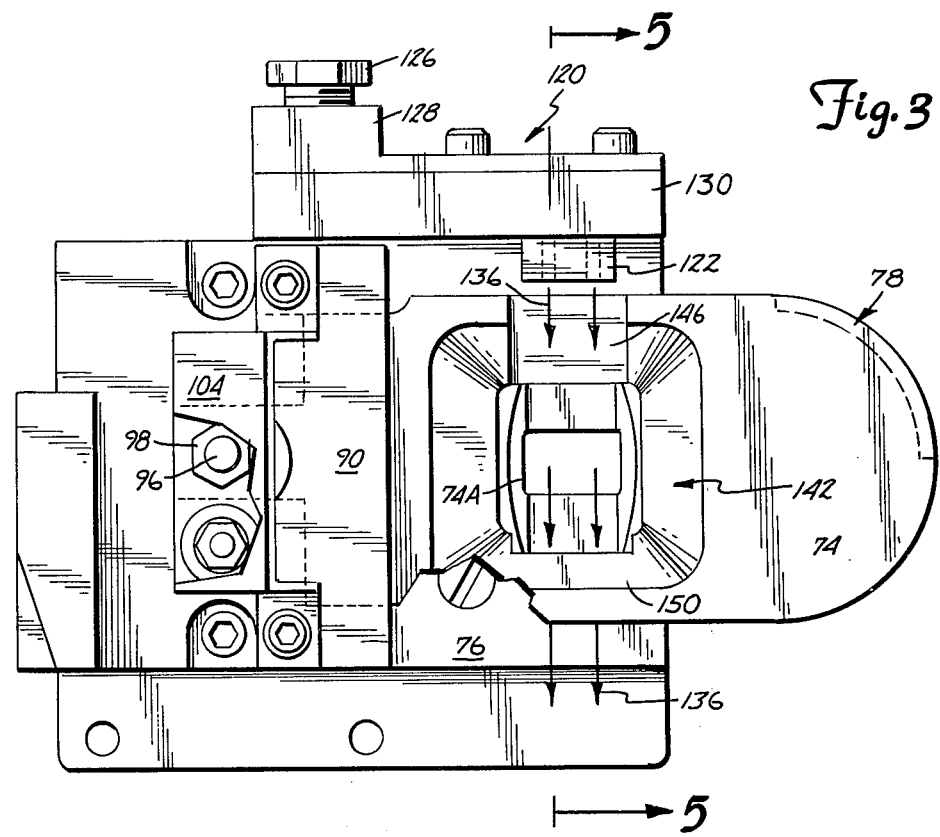
FIG. 3 is a top plan view of a aperture assembly of the neghold assembly of FIG. 2.

In the following discussion, a photographic printer capable of printing disc format photographic film, and including the film cleaning apparatus of the present invention is described. Although the film cleaning apparatus of the present invention is equally applicable to web format photographic film as well as disc format film, for simplicity only the use of the present invention in regard to the disc film format will be described in detail.

FIG. 1 shows a photographic printer 10 which includes the film cleaning apparatus of the present invention. Printer 10 is generally similar to the Pako B/C24XLS photographic printer, and is capable of handling both web and disc format photographic films. A general description of the optical and electrical system of photographic printer 10 can be found in U.S. Pat. No. 4,235,511 by Harvey and U.S. Pat. No. 4,175,852 by Baeret, both of which are assigned to the same assignee as the present application.

Printer 10 includes light-tight cabinet 12, console 14 which is mounted on top of cabinet 12, and lamphouse 16 which is mounted above console 14. As shown in FIG. 1, console 14 includes a pair of panels, control panel 18 and keyboard 20, which contain various switches and keys to initiate and control various functions of operation of printer 10.

Lamphouse 16 contains print lamps (not shown) which provide high intensity light. The light is directed downwardly by means of drop cone assembly 21 in an essentially uniform light distribution. The light passes through a frame of photographic film 22 which is clamped at a print gate aperture and passes downwardly into cabinet 12. The light is imaged by optics contained within cabinet 12 onto a selected portion of a web of photosensitive print paper (not shown) within cabinet 12. An exposure control system of the photographic printer 10 controls the exposure of the photosensitive print paper in red, green and blue color chanels.

As shown in FIG. 1, printer 10 includes film supply assembly 23 and film takeup assembly 24 which are used for handling web format film. To accommodate disc format film, supply tube 25 and takeup tube 26 are provided. Supply tube 25 includes a spindle 27 mounted coaxially within tube 25. Film discs which have been developed, and are to be printed on photographic printer 10 are contained on spindle 27 within tube 25. Takeup tube 26 contains spindle 28, on which disc films 22 are placed after printing on printer 10.

Disc film 22 is held and individual image frames are indexed to a print gate under drop cone 21 by neghold assembly 30, which is more fully illustrated in FIG. 2. Neghold assembly 30 includes a movable film transport assembly 32 and a stationary film gate assembly 34. Film transport assembly 32 is movable in a generally horizontal plane along a pair of horizontal rails (not shown) from a position under drop cone 21, as shown in FIG. 1 to a position closer to the front of console 14. This allows the operator to remove a film disc unit 22 from transport assembly 32 after printing, to place the completed disc on spindle 28 within takeup tube 26, to remove the next disc film 22 from spindle 27 of supply tube 25, and to place the next disc film 22 on transport assembly 32. Transport assembly 32 is then pushed back into its normal operating position with film disc 22 positioned with one frame below drop cone 21.

FIG. 2 shows neghold assembly 30 with film transport assembly 32 in its fully inserted position under drop cone 21, as shown in FIG. 1. Film transport assembly 32 includes a slidable base plate 38 which slides over the rails, and which supports the other mechanisms of transport assembly 32. Film disc 22 is mounted on post 40, which has a key 42 which corresponds with a notch in core or hub 22A of disc 22 to ensure that disc 22 can be placed on post 40 in only one orientation.

To provide rotational indexing of the individual frames of film disc 22, post 40 is rotated by operation of film advance solenoid 44 of film gate assembly 34 through a film advance mechanism mounted on transport plate 38. This film advance mechanism includes first pivot arm 46, second pivot arm 48, third pivot arm 50, striking block 52, bias spring 54, ratchet wheel 56, pawl 58, pawl bias spring 60, and gears 62, 64 and 66.

Post 40 is attached to and is driven by gear 66. Indexing of disc 22 is produced by actuating film advance solenoid 44 which has a plunger 68 which strikes striking block 52 which is attached to pivot arm 46. This forces transfer through pivot arms 46, 48 and 50 to ratchet wheel 56 and gear 62, which are coaxially aligned and are driven together in a clockwise direction. This causes counterclockwise rotation of gear 64, and clockwise rotation of gear 66. This film indexing mechanism is described in further detail in the previously mentioned copending patent application "Disc Film Advance Assembly", and that description is hereby incorporated by reference.

Transport assembly 32 also includes an upturned handle 68 at its front left corner and a sliding latching mechanism 70 which latches transport plate 38 in a locked operating position as shown in FIG. 2 during printing. Latch mechanism 70 also cooperates with transport base sensing mechanism 72 of film gate assembly 34 to provide an electrical signal which indicates when transport assembly 32 is in position for printing. The operation of sliding latch mechanism 70 and sensing mechanism 72 is described further in the copending patent application entitled "Neghold Assembly" and is hereby incorporated by reference.

During a print exposure cycle, an image contained in disc 22 is clamped between top and bottom aperture plates 74 and 76 of aperture assembly 78, which is a part of film gate assembly 34. Aperture assembly 78 is shown in further detail in FIGS. 3–5.

As best shown in FIG. 5, top aperture plate 74 and bottom aperture plate 76 have light transmitting apertures 74A and 76A which are aligned when top aperture plate 74 is in a clamping position during a print exposure cycle. As shown in FIG. 5, film 22 is clamped between aperture plates 74 and 76 during printing.

Disc 22 has notches at circumferentially spaced positions about its edge. Each of these notches has a predetermined spatial relationship to the position of an adjacent image area on disc 22. Precise alignment of the respective image areas on film disc 22 with apertures 74A and 76A is provided by alignment pawl 80, which engages the notch in the edge of film disc 22 which has a precisely defined relationship to the position of the image area located at the print gate. In the embodiment shown in FIG. 2, the position of pawl 80 is controlled by solenoid 82 through pivot arm 84, which is connected to pawl 80. Solenoid 82 is actuated to withdraw pawl 80 from engagement with a notch in the edge of disc 22 to allow indexing of disc 22 to bring the next image area into alignment with apertures 74A and 76A.

Figure 4:
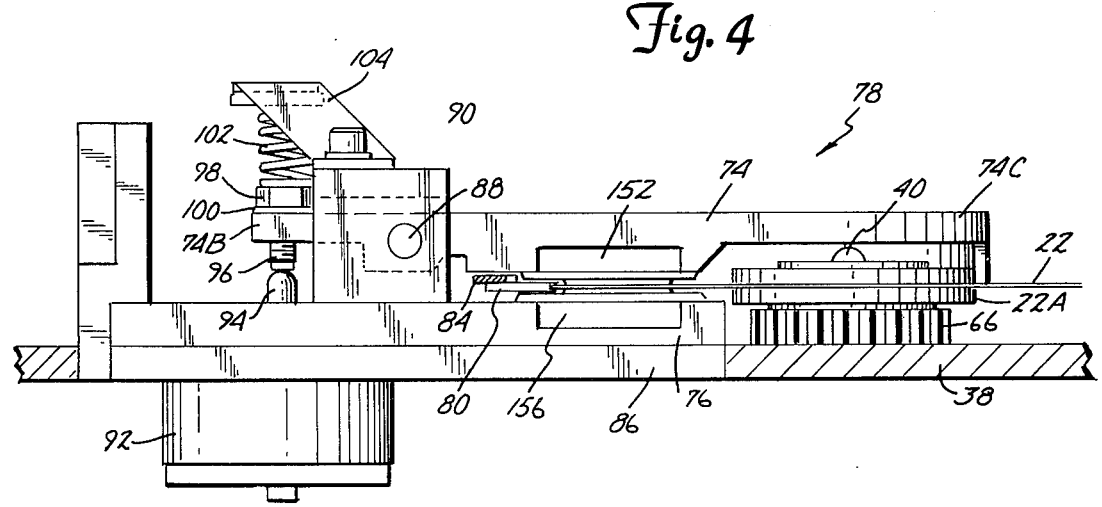
FIG. 4 is a front elevational view of the aperture assembly of FIG. 3, with a film disc shown in clamped position.

As best shown in FIGS. 3 and 4, bottom aperture plate 76 is fixedly attached to base 86 of film gate assembly 34. Top aperture plate 74, on the other hand, is attached to pivot shaft 88, which is supported at each end by support 90. Pivot shaft 88 and top aperture plate 74 are pivotable about a pivot axis defined by pivot shaft 88.

The position of top aperture plate 76 is controlled by film clamp solenoid 92, which is mounted below base 86, and has the upper end of its plunger 94 extending upward to engage the lower end of solenoid adjustment screw 96. Adjustment screw 96 is positioned at end 74B of aperture plate 74 and extends through a screw threaded aperture (not shown). Nut 98 and washer 100 hold adjusting screw 96 in a selected position in order to provide the desired amount of clamping force when plunger 94 is in its uppermost position.

A bias force tending to push end 74B of aperture plate 74 downward (and thus bias aperture plate 74 to an open position when solenoid 92 is not actuated) is provided by bias compression spring 102. Retainer 104 is mounted on support 90 and extends above the end of aperture plate 74 so that bias spring 102 is held between retainer 102 and the top end of adjusting screw 96 and hex nut 98.

When solenoid 92 is actuated, plunger 94 is driven upward, which tips end 74B of aperture plate 74 upward and pivots opposite end 74C of aperture plate 74 downward to clamp film 22 between aperture plate 74 and aperture plate 76. When solenoid 92 is deenergized, plunger 94 moves downward, and bias spring 102 pushes end 74B of aperture plate 74 downward. This causes film 22 to be unclamped whenever solenoid 92 is deenergized. This type of film clamping arrangement is described in further detail in U.S. Pat. No. 4,313,677 by Stewart, which is assigned to the same assignee as the present application.

The film cleaning apparatus of the present invention cleans photographic film 22 while it is clamped in aperture assembly 78 at the print gate and maintains the top and bottom surfaces of film disc 22 free from dust during exposure.

The film cleaning apparatus of the present invention provides this cleaning by directing a first high velocity stream of ionized air across the top and bottom surfaces of the clamped film 22 prior to commencement of an exposure cycle of photographic printer 10. This high velocity stream of ionized air removes dust from the image area as defined by apertures 74A and 74B. The film cleaning apparatus then directs a lower velocity stream of ionized air across the top and bottom surfaces of the clamped film 22 to prevent dust from resettling on the surfaces of film 22 during an exposure cycle.

As best illustrated in FIG. 2, the film cleaning apparatus includes first manifold block (which receives high or low pressure of air through inlet 112), ionizer 114, couplings 116 and 118, and second manifold 120. The high or low pressure air is supplied from first manifold 110 to ionizer 114, which ionizes the air and then supplies that ionized air through couplings 116 and 118 to manifold 120. The ionized air is exhausted from manifold 120 through upper nozzle 122 and lower nozzle 124 (shown in FIG. 5) to provide the ionized air streams which are directed onto the top and bottom surfaces of film disc 22 clamped at the print gate.

As best shown in FIG. 2 and in FIG. 5, manifold 120 includes inlet fitting 126, cover 128, and orifice block 130. Top nozzle 122 is an integral part of block 130, and includes a pair of orifices 132 (as shown in FIG. 6) to communicate with main chamber 134 of manifold 120 to direct air downward at an acute angle with respect to the top surface of film 22. Arrows 136 illustrate the path of the ionized air directed from orifices 132 onto the top surface of film 22.

Similarly, lower nozzle 124 directs a stream of ionized air upward onto the bottom surface of film 22 at an acute angle. Nozzle 124 includes a pair of orifices 138 which communicate with main chamber 134 of manifold 120. The path of the lower stream of ionized air is illustrated by arrows 140.

In a preferred embodiment of the present invention shown in the Figures, top and bottom aperture plates 74 and 76 provide ramp surfaces to guide the streams of ionized gas from the top and bottom nozzles 122 and 124. Top and bottom aperture plates 74 and 76 have large concave portions 142 and 144 surrounding apertures 74A and 76A, respectively. In addition, a downwardly sloped ramp surface extending from near top nozzle 122 down to aperture 74A is provided in aperture plate 74. Similarly, an upwardly sloped ramp 148 is provided in bottom aperture plate 76 extending from near lower nozzle 124 up to aperture 76A.

An upwardly sloped ramp surface 150 leads from aperture 74A upwardly on the opposite side of aperture 74A from ramp 146. In addition, horizontal passage 152 is provided which allows the air to exit from the print gate area through top aperture plate 74. Similarly, ramp surface 154 and horizontal passage 156 are provided to allow the ionized air from lower nozzle 124 to leave the print gate area after it has been directed onto to the lower surface of film disc 22. This allows dust which has been raised or blown by the streams of ionized air to be removed from the print gate area, rather than being allowed to reaccumulate on the surfaces of film disc 22.

FIG. 7 is a schematic diagram of the portion of the film cleaning apparatus of the present invention which supplies the high/low pressure air to inlet 112 of first manifold 110. Inlet air from an air supply system of the photofinishing facility (or from a compressor and accumulator) is supplied to inlet 180. The inlet air passes through pressure regulator 182, which lowers the pressure of the air to about 50 to 60 psi. The air then passes through two line filters 184, which remove particulates or aerosols from the air.

Two branches are provided between line filter 184 and outlet 186 of the air supply system shown in FIG. 7. High pressure branch 188 includes high pressure solenoid valve 190 which is electrically controlled to either pass or block air flow to outlet 186.

Low pressure branch 192 includes low pressure solenoid valve 194 and pressure or flow reducing device 196. Solenoid valve 194 determines, by its state of energization, whether air flow is permitted or blocked through low pressure branch 192. Device 196 (which is, for example, a pressure regulator or flow control valve) reduces the output pressure of air passing through low pressure branch 192 to the range of about 1 to 3 psi.

Outlet 186 is connected to inlet 112 of manifold 110. Depending upon the state of solenoid valves 190 and 194, either high pressure air, low pressure air, or no air is supplied from nozzles 122 and 124 of manifold 120.

Figure 8:
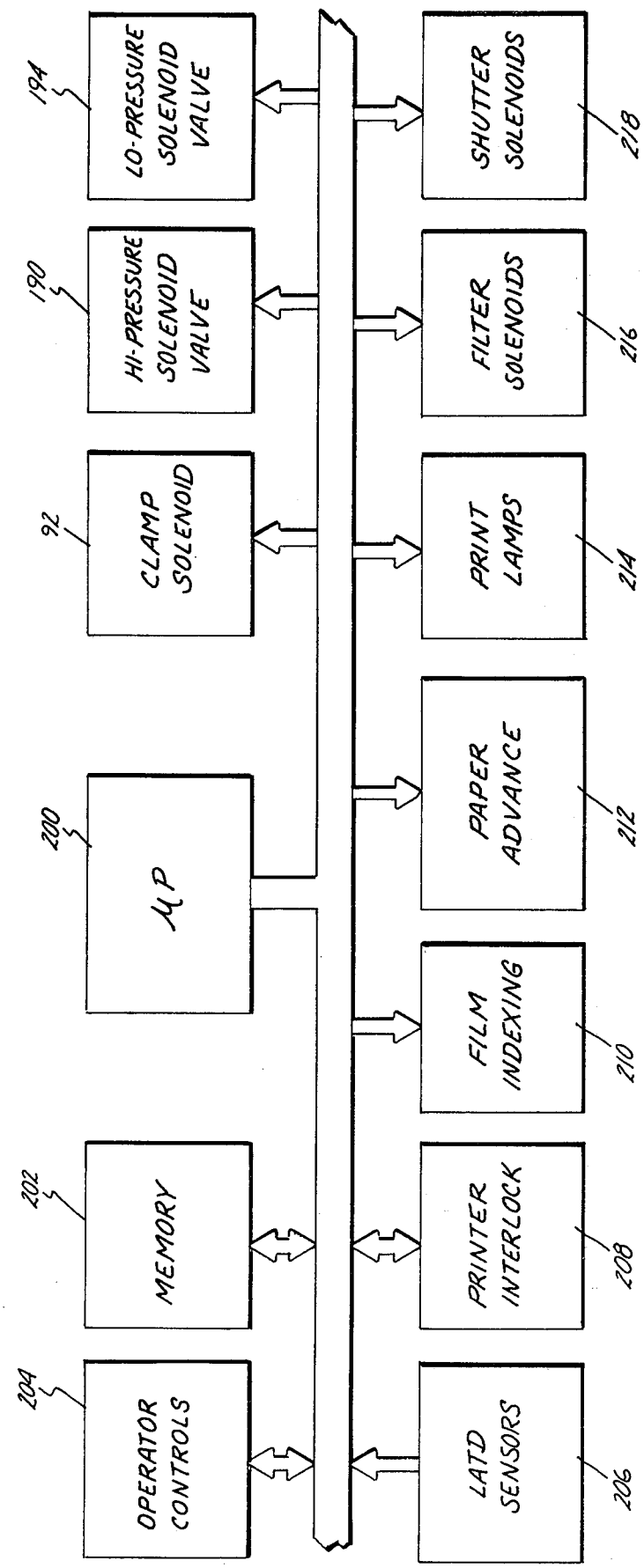
FIG. 8 is an electrical block diagram of the control system of a photographic printer which includes the film cleaning apparatus of the present invention.

FIG. 8 is an electrical block diagram illustrating a control system of a preferred embodiment of printer 10 which includes the film cleaning apparatus of the present invention. Control of operation of printer 10 is determined and coordinated by microprocessor 200 based upon stored operating programs and data contained in memory 202 and based upon input signals received from operator controls 204, LATD sensors 206, and printer interlock circuitry 208. Operator controls 204 include control panels 18 and 20. These inputs can select a particular operator parameter to be used by microprocessor 200 in controlling operation of printer 10, and also include inputs which initiate various control functions of microprocessor 200.

LATD sensors 206 sense large area transmission density of the particular image area of film 22 in the print gate. The signals from LATD sensors 206 are used by microprocessor 200 to calculate and control red, green and blue exposure times.

Printer interlock circuitry 208 includes various sensors such as sensing mechanism 72 shown in FIG. 2. The interlock circuitry provides signals which ensure that printer 10 is ready and able to conduct the desired activity controlled by microprocessor 200, and that an error condition is not present.

Microprocessor 200 controls film indexing system 210 and paper advance system 212 to bring the desired image area of film to the print gate for printing, and to bring an unexposed portion of the print paper into position to receive the image during an exposure cycle. Film indexing system 210 includes, in the case of disc film format, solenoid 44 and related parts of neghold assembly 30.

Microprocessor 200 controls print lamps 214, filter solenoids 216, and shutter solenoid 218 during an exposure cycle to provide the desired red, green and blue exposures of the print paper.

As shown in FIG. 8, microprocessor 200 also controls clamp solenoid 92 and solenoid valves 190 and 194. In a preferred embodiment of the present invention, microprocessor 200 coordinates the operation of clamp solenoid 92, solenoid valves 190 and 194 with the operation of film indexing system 200 and the exposure cycle. In this preferred embodiment, high pressure solenoid valve 190 and low pressure solenoid valve 194 are initially turned on by microprocessor 200 to provide a short duration (approximately 100 milliseconds) blast of high velocity/high pressure air from top and bottom nozzles 122 and 124. At the end of the high pressure blast, microprocessor 200 turns off solenoid valve 190, and low pressure solenoid valve 194 remains on. The air exhausted from nozzles 122 and 124 is then in the neighborhood of 1 to 3 psi and continues to flow as the exposure cycle starts and through the duration of the print exposure cycle. This low pressure flow of air prevents dust from landing on the surfaces of the image area of film 22 clamped in the print gate during the print exposure.

The print exposure cycle is initiated by microprocessor 200 by actuating shutter solenoid 218. Individual exposures in the red, green and blue color channels are controlled by microprocessor 200 by selectively actuating filter solenoids 216. During this exposure cycle, the flow of low pressure air from nozzles 122 and 124 continues. At the end of the exposure cycle, microprocessor 200 turns off solenoid valve 194, thus stopping all air flow, and deenergizes clamp solenoid 92. The next film indexing and paper advance cycle can then be initiated by microprocessor 200.

Use of ionized air before and during the exposure cycle produces an air flow past the surfaces of film 22 which is rich in free ions. During the initial high pressure blast of ionized air, the free ions neutralize any static charges on film 22, which allows the dust and other particles to be removed more readily from the surfaces of film 22. Once the charges have been neutralized, the continued flow of the ionized air rich in free ions prevents static charges from building up and attracting new dust.

The use of air flow of two different pressures (high pressure before exposure is commenced and low pressure during exposure) prevents fluttering or vibraton of the film 22 during exposure. This is particularly important with larger film formats such as "126" and "135" format film, since the image area of the film is much larger than disc format film, and there is thus a larger unclamped area which can vibrate if the pressure or velocity of the cleaning air is too great.

Another important feature of the present invention is that the cleaning with high pressure air and later low pressure occurs only while film 22 is clamped at the print gate. If film 22 has high pressure air directed against it while it is in an unclamped state, there is a possibility of vibration of film 22 which could bring it into contact with edges of apertures 74A and 76A, where scratching of the film surfaces could occur.

In the preferred embodiments of the present invention, in which multiple levels of air pressure are provided under the control of microprocessor 200, great flexibility in the cleaning function is possible. For example, if extra dirty film is encountered, it can be desirable to perform multiple blasts of high pressure air before an exposure cycle is commenced. Microprocessor 200 and the control system shown in FIG. 8 provide the flexibility of control which allows multiple high pressure blasts to be provided. This can be either a result of operator actuation through operator controls 204, or on an automatic basis based upon print characteristics of the film.

In conclusion, the present invention provides highly effective film cleaning apparatus which is applicable to both web and disc format films, which ensures that dust and other foreign material does not reaccumulate on the film between the time the film is cleaned and the time a print exposure occurs, and which is consistent with automatic high speed operation of a photographic printer.

Although the present invention has been described with reference to preferred embodiments, workers skilled in the art will recognize that changes may be made in form and detail without departing from the spirit and scope of the invention.

What is claimed is:

1. Photographic film cleaning apparatus for cleaning an image area of photographic film at a print gate aperture of a photographic printer, the apparatus comprising:
    clamping means at the print gate for clamping the photographic film with the image area aligned with the print gate aperture prior and during an exposure cycle of the printer;
    means for directing a first higher velocity gas onto the image area of the clamped photographic film prior to the exposure cycle to remove particles from a surface of the image area; and
    means for directing a second lower velocity gas onto the image area of the clamped photographic film during the exposure cycle to prevent particles from settling on the surface of the image area.

2. The apparatus of claim 1 wherein the means for directing a first higher velocity gas and the means for directing a second lower velocity gas comprise:
    first nozzle means for directing a stream of gas at an acute angle onto a first surface of the image area of the clamped photographic film; and
    means for selectively providing a first higher pressure gas to the first nozzle means to produce the first higher velocity gas in a stream from the first nozzle means prior to the exposure cycle and selectively providing a second lower pressure gas to the first nozzle means to produce the second lower velocity gas in the stream during the exposure cycle.

3. The apparatus of claim 2 wherein the clamping means has a first ramp surface extending from a position proximate the first nozzle means to a position proximate the print gate aperture to guide the gas stream from the first nozzle means to the first surface of the photographic film.

4. The apparatus of claim 3 wherein the clamping means includes means for guiding the gas stream away from the print gate aperture after it has passed over the first surface of the clamped photographic film.

5. The apparatus of claim 4 wherein the means for guiding the gas stream comprises a second ramp surface positioned on an opposite side of the print gate aperture from the first ramp surface and sloped away from the image area to guide the gas stream away from the first surface of the clamped photographic film.

6. The apparatus of claim 5 wherein the means for guiding further includes a gas passage having an inlet communicating with the second ramp surface for receiving the gas stream and directing the gas stream away from the print gate.

7. Photographic film cleaning apparatus for cleaning an image area of photographic film at a print gate aperture of a photographic printer, the apparatus comprising:
    clamping means at the print gate for clamping the photographic film with the image area aligned with the print gate aperture;
    first nozzle means for directing a first gas stream at an acute angle onto a first surface of the clamped image area of the photographic film;
    second nozzle means for directing a second gas stream at an acute angle onto a second surface of the clamped image area of the photographic film; and
    gas supply means for supplying gas to the first and second nozzle means.

8. The apparatus of claim 7 wherein the gas supply means comprises:
    means for supplying first high pressure gas to the first and second nozzle means prior to an exposure cycle of the printer to remove dust from the first and second surfaces of the clamped image area; and
    means for supplying a second lower pressure gas to the first and second nozzle means during the exposure cycle to prevent dust from settling on the first and second surfaces of the image area during exposure.

9. The apparatus of claims 7 or 8 wherein the gas supply means comprises:
    an inlet for receiving air under pressure;
    a high pressure path between the inlet and the first and second nozzle means;
    a high pressure solenoid valve connected in the high pressure line for controlling air flow through the high pressure line to the first and second nozzle means;
    a low pressure line connected between the inlet and the first and second nozzle means;
    a low pressure solenoid valve for controlling air flow through the low pressure line to the first and second nozzle means; and
    control means for controlling the high pressure solenoid valve and the low pressure solenoid valve.

10. The apparatus of claim 9 and further comprising:
    ionizing means connected between the high and low pressure lines and the first and second nozzle means for ionizing air supplied from the high and low pressure lines to the first and second nozzle means.

11. The apparatus of claim 7 wherein the clamping means comprises:
    a movable aperture plate at the print gate having a first aperture;

a stationary aperture plate at the print gate having a second aperture;

means for selectively moving a movable aperture plate between a clamping position in which an image frame of the photographic film is clamped at the print gate aperture between the movable and stationary aperture plates with the image plane aligned with the first and second apertures, and a non-clamping position in which the movable aperture plate is spaced from the photographic film and the stationary aperture plate to permit indexing a selected image area of the photographic film into alignment with the print gate aperture.

12. The apparatus of claim 11 wherein the movable aperture plate has a ramp surface extending from a position proximate the first nozzle means to the first aperture for guiding the gas stream from the first nozzle means to the first surface of the clamped image area.

13. The apparatus of claim 12 wherein the movable aperture plate further includes means for guiding the gas stream away from the print gate aperture after it has passed over the first surface of the clamped image area.

14. The apparatus of claim 13 wherein the means for guiding includes a passage extending through the movable aperture plate.

15. The apparatus of claims 11 or 12 wherein the stationary aperture plate has a ramp surface extending from a position proximate the second nozzle means to the second aperture for guiding the gas stream from the second nozzle means to the second surface of the clamped image area.

16. The apparatus of claim 15 wherein the stationary aperture plate further includes means for guiding the gas aperture after it has passed over the second surface of the clamped image area.

17. The apparatus of claim 16 wherein the means for guiding includes a passage extending through the stationary aperture plate.

* * * * *